United States Patent [19]

Schurger et al.

[11] Patent Number: 5,026,324
[45] Date of Patent: Jun. 25, 1991

[54] SEALING DEVICE FOR BEARINGS, PARTICULARLY BEARING BUSHINGS OF UNIVERSAL JOINTS

[75] Inventors: Rainer Schurger, Schwanfeld; Bernhard Bauer, Hassfurt, both of Fed. Rep. of Germany

[73] Assignee: SKF GmbH, Schweinfurtl, Fed. Rep. of Germany

[21] Appl. No.: 343,295

[22] Filed: Apr. 26, 1989

[30] Foreign Application Priority Data

May 3, 1988 [DE] Fed. Rep. of Germany ... 8805833[U]

[51] Int. Cl.$^5$ .................... F16C 33/78; F16D 3/41
[52] U.S. Cl. ........................ 464/131; 277/152; 277/207 R; 384/486
[58] Field of Search ............... 277/152, 188 A, 207 R; 384/484, 485, 486; 464/11, 14, 128, 129, 131, 133

[56] References Cited

U.S. PATENT DOCUMENTS

| | | | |
|---|---|---|---|
| 3,797,899 | 3/1974 | Anderson | 384/486 X |
| 4,154,490 | 5/1979 | Kohler et al. | 464/133 X |
| 4,219,205 | 8/1980 | Christiansen et al. | 277/152 X |
| 4,350,347 | 9/1982 | Heinrich | 277/207 R X |
| 4,512,672 | 4/1985 | Olschewski et al. | 464/131 X |
| 4,566,812 | 1/1986 | Takei et al. | 384/484 |
| 4,834,691 | 5/1989 | Schultze et al. | 464/131 |
| 4,848,776 | 7/1989 | Winckler | 384/486 X |

FOREIGN PATENT DOCUMENTS

| | | | |
|---|---|---|---|
| 3118430 | 11/1982 | Fed. Rep. of Germany | 464/131 |
| 8701169 | 2/1987 | World Int. Prop. O. | 277/152 |

Primary Examiner—Daniel P. Stodola
Attorney, Agent, or Firm—Eugene E. Renz, Jr.

[57] ABSTRACT

A seal for bearings such as a bearing bushing of a universal joint having inner and outer members with confronting spaced raceways. The seal includes at least one circumferentially extending sealing lip which engages a surface of one of the members outboard of the raceway and includes stiffening or rigidifying ribs which prevents inversion of the seal upon assembling.

7 Claims, 1 Drawing Sheet

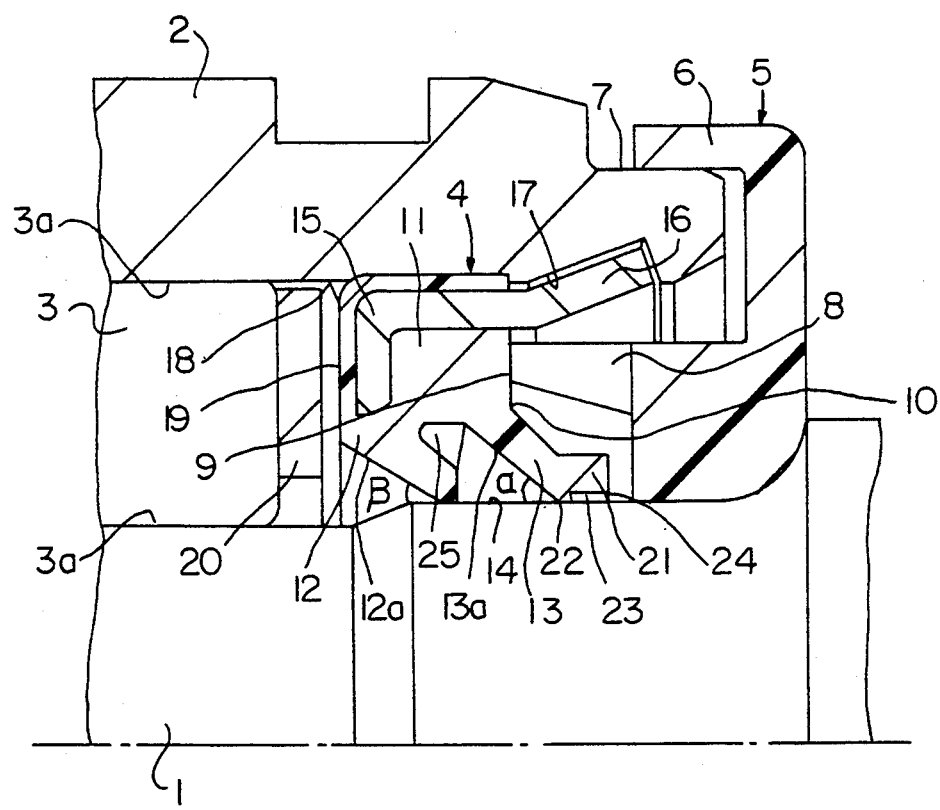

SEALING DEVICE FOR BEARINGS, PARTICULARLY BEARING BUSHINGS OF UNIVERSAL JOINTS

FIELD OF THE INVENTION

The present invention relates to seals for bearings, particularly for the bearing bushings of universal joints.

BACKGROUND OF THE INVENTION

Seals of the type to which the present invention relate are adapted for mounting on bearing rings or the like and rest with one or more of its sealing lips engaging against the surface of a machine part to be supported in the bearing ring. A seal of this general type is shown in West German Pat. No. 3,118,430. In accordance with the seal shown in this patent, the sealing lips can be inverted when the bearing bushing is pushed onto the universal joint which often results in damage to the seal.

SUMMARY OF THE INVENTION

With the foregoing in mind, it is an object of the present invention to provide a seal of the type described above which is characterized by novel features of construction and arrangement to facilitate installation without difficulty and which insures a good seal. To this end, in accordance with the present invention, means is provided for stiffening the sealing lip in the area of the sealing edge on the side thereof facing away from the bearing surfaces. By reason of this construction, the sealing lip is effectively prevented from being inverted when the machine part to be supported is assembled.

In accordance with another feature of the present invention designed to achieve a better sealing action, the sealing lip is provided with an axially oriented peripherally extending projection having a bore surface forming a sealing gap with the lateral surface of the machine part to be supported. This projection is located on the side facing away from the bearing surfaces.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is an enlarged, transverse, sectional view of a bearing bushing incorporating a seal constructed in accordance with the present invention.

DETAILED DESCRIPTION OF THE PREFERRED EMBODIMENT

Referring now to the drawing, and particularly to FIG. 1 thereof, there is illustrated a universal joint including a pin 1 rotatably supported in a bearing bushing 2 by means of cylindrical rollers 3 which roll on circumferentially extending confronting bearing raceway surfaces 3a. Bearing bushing 2 is sealed at its open end by a pair of inner and outer sealing rings 4 and 5, respectively. Outer sealing ring 5 acts as a forward seal where its precise, correct axial position is defined by axially extending projections 8. The radial surfaces 9 of the projections 8 abut the end surface 10 of the inner sealing ring 4. As illustrated, inner sealing ring 4 consists of a base element 11 with a pair of sealing lips 12 and 13 which engage lateral surface 14 and embedded L-shaped sheet metal ring 15 having an angularly offset part 16 which projects out of base element 11 of sealing ring 4. Outwardly flared portion 16 snaps into an annular groove 17 in the bore 18 of the bearing bushing 2 and retains the inner sealing ring 4 in the axial direction.

A thrust 20 washer is disposed between the axial ends of the rollers 3 and a contact surface 19 of the inner sealing ring which confronts axial ends of the rollers. In a preferred embodiment of the invention, the frusto-conical portion 13a of sealing lip 13 facing away from the cylindrical rollers is slanted at a greater angle $\alpha$ to lateral surface 14 than the angle $\beta$ which the sealing lip 12 adjacent the cylindrical rollers makes with the lateral surface 14. By this construction, when the assembled bearing bushing is pushed onto the bearing pin 1, the sealing lip 13 facing away from the cylindrical rollers can be more easily inverted and damaged. To prevent this inversion, a molded peripheral projection 21 is provided on the outer peripheral surface of the sealing lip 13 which reinforces the sealing lip in the area of the sealing edge 22. The bore surface 23 of projection 21 forms a sealing gap 24 with the lateral surface 14 of pin 1, which is filled with a lubricant such as grease to improve the sealing action.

In accordance with an additional feature of the present invention designed to provide a greater security against inversion of the sealing lip 12 support ribs 25 are provided which bridge and connect sealing lip 12 and sealing lip 13 to base element 11 of sealing ring 4. If desired, sealing lip 13 can be designed without a peripheral projection 21.

Even through a particular embodiment of the invention has been illustrated and described herein, it is not intended to limit the invention and changes and modification may be made within the scope of the following claims. For example, even though the sealing device is shown in association with a universal joint, it has other useful applications such as in journal bearings.

What is claimed is:

1. Seal for a bearing bushing of a universal joint having inner and outer members with confronting spaced annular raceways (3a) comprising means for mounting the seal (4) in the annular space between the raceways and including a base element (11), at least one circumferentially extending sealing lip (12, 13) extending therefrom which engages a surface of one of the members outboard of the raceway and means for stiffening or rigidifying said at least one sealing lip to prevent inversion on assembly comprising the sealing lip having a series of circumferentially spaced axially extending support ribs connecting the base element (11) of the seal (4) to said one sealing lip on the side facing away from the raceway surface (3a).

2. A sealing ring as claimed in claim 1, wherein the seal includes a frusto-conical sealing lip and an axially oriented peripheral projection (21).

3. A sealing ring as claimed in claim 2, wherein the bore surface (23) of the projection (21) forms a circumferentially extending gap together with the lateral surface (14) of the machine part for a lubricant.

4. Seal for a bearing bushing of a universal joint having inner and outer members with confronting spaced annular raceways (3a) comprising means for mounting the seal (4) in the annular space between the raceways and including a base element (11), at least one circumferentially extending sealing lip (12, 13) extending therefrom which engages a surface of one of the members outboard of the raceway and means for stiffening or rigidifying said at least one sealing lip to prevent inversion on assembly comprising the sealing lip having a series of circumferentially spaced axially extending support ribs connecting the base element (11) of the seal (4) to said one sealing lip on the side facing away from the raceway surface (3a) and a reinforcing member having a portion embedded in the seal and an angularly offset projecting part (16) engageable in a groove (17) in one of the members to seat the seal in an axial direction.

5. A seal as claimed in claim 4 wherein said one sealing lip comprises a frusto-conical portion and an axially directed projection (21) extending from the end of said frusto-conical portion remote from said base element (11).

6. A seal as claimed in claim 5 wherein said projection (21) has a bore surface (23) spaced radially from said surface of said one member engaged by said sealing one lip (12, 13) to form a pocket for lubricant.

7. Seal for a bearing bushing of a universal joint having inner and outer members with confronting spaced annular raceways (3a) comprising means for mounting the seal (4) in the annular space between the raceways and including a base element (11), inner and outer sealing lips (12, 13) extending from said base element (11) which engage a surface of one of said members outboard of the raceway, said outer sealing lip being disposed at a greater angle to the surface of said one member than the inner sealing lip which is closer to said raceway, and means for stiffening or rigidifying at least one sealing lip to prevent inversion on assembly comprising said at least one sealing lip having a series of circumferentially spaced axially extending support ribs connecting the base element (11) of the seal (4) to said one sealing lip on the side facing away from the raceway surface (3a) and a reinforcing member having a portion embedded in the seal and an angularly offset projecting part (16) engageable in a groove (17) in one of the members to seat the seal in an axial direction.

* * * * *